United States Patent
Ali et al.

(10) Patent No.: US 11,913,429 B2
(45) Date of Patent: Feb. 27, 2024

(54) SYSTEM AND METHOD FOR SLIP DETECTION AND SURFACE HEALTH MONITORING IN A SLIP COUPLING OF A ROTARY SHAFT

(71) Applicant: General Electric Renovables Espana, S.L., Barcelona (ES)

(72) Inventors: Shahid Ali, Bangalore (IN); Rupam Mukherjee, Bangalore (IN); Jishnu Kavil Kambrath, Kannur (IN); Veena Padmarao, Bangalore (IN); Arvind Kumar Tiwari, Niskayuna, NY (US); Benjamin Simon Engels, Osnabrueck (DE); Norman Arnold Turnquist, Carlisle, NY (US)

(73) Assignee: General Electric Renovables Espana, S.L., Barcelona (ES)

( * ) Notice: Subject to any disclaimer, the term of this patent is extended or adjusted under 35 U.S.C. 154(b) by 209 days.

(21) Appl. No.: 17/244,151

(22) Filed: Apr. 29, 2021

(65) Prior Publication Data
US 2022/0349385 A1 Nov. 3, 2022

(51) Int. Cl.
*F03D 17/00* (2016.01)
*F03D 7/04* (2006.01)
(Continued)

(52) U.S. Cl.
CPC ............. *F03D 17/00* (2016.05); *F03D 7/046* (2013.01); *F03D 15/00* (2016.05); *H02P 9/102* (2013.01);
(Continued)

(58) Field of Classification Search
CPC .......... F03D 17/00; F03D 7/046; F03D 15/00; F03D 7/0272; F03D 7/0244; H02P 9/102;
(Continued)

(56) References Cited

U.S. PATENT DOCUMENTS

| 4,605,107 A | 8/1986 | Hallidy et al. |
| 4,660,697 A | 4/1987 | Yoneda et al. |

(Continued)

FOREIGN PATENT DOCUMENTS

| CA | 2343876 A1 | 10/2002 |
| CN | 202645849 U | 1/2013 |

(Continued)

OTHER PUBLICATIONS

Ahmar et al., Advanced Signal Processing Techniques for Fault Detection and Diagnosis in a Wind Turbine Induction Generator Drive Train: A Comparative Study, 5617707, 2010 IEEE Energy Conversion Congress and Exposition, Atlanta, GA, 2010, pp. 3576-3581. (Abstract Only) https://ieeexplore.ieee.org/document/5617707.

(Continued)

*Primary Examiner* — Joseph Ortega
(74) *Attorney, Agent, or Firm* — Dority & Manning, P.A.

(57) ABSTRACT

A method for operating a generator of a wind turbine includes generating, via a controller, a time series of a plurality of operating signals of the generator. The method also includes applying at least one algorithm to the time series of the plurality of operating signals of the generator to generate a processed time series of the of the plurality of operating signals of the generator. Moreover, the method includes identifying, via the controller, patterns in the processed time series of the plurality of operating signals of the generator to identify one or more of at least one slip event occurring in the slip coupling or a surface health of the slip coupling. Further, the method includes implementing, via the controller, a control action when the at least one slip event occurring in the slip coupling is identified or the surface health of the slip coupling is indicative of degradation in the slip coupling.

17 Claims, 8 Drawing Sheets

(51) Int. Cl.
  *F03D 15/00* (2016.01)
  *H02P 9/10* (2006.01)
  *H02P 101/15* (2016.01)

(52) U.S. Cl.
  CPC ..... *F05B 2220/706* (2013.01); *F05B 2260/80* (2013.01); *F05B 2270/303* (2013.01); *F05B 2270/327* (2013.01); *F05B 2270/331* (2013.01); *F05B 2270/335* (2013.01); *F16D 2300/18* (2013.01); *H02P 2101/15* (2015.01)

(58) Field of Classification Search
  CPC ............ H02P 2101/15; F05B 2220/706; F05B 2260/80; F05B 2270/303; F05B 2270/327; F05B 2270/331; F05B 2270/335; F05B 2260/4023; F05B 2270/309; F05B 2270/709; F16D 2300/18; Y02E 10/72
  See application file for complete search history.

(56) References Cited

U.S. PATENT DOCUMENTS

| | | |
|---|---|---|
| 8,123,478 B2 | 2/2012 | Ahmann |
| 8,317,462 B2 | 11/2012 | Daniels et al. |
| 8,332,164 B2 | 12/2012 | Castell Martinez |
| 8,364,424 B2 | 1/2013 | Lou et al. |
| 8,692,400 B2 | 4/2014 | Lee |
| 9,423,290 B2 | 8/2016 | Sakaguchi et al. |
| 9,458,835 B2 | 10/2016 | Ikeda et al. |
| 9,835,136 B2 | 12/2017 | Haj-Maharsi |
| 10,006,441 B2 | 6/2018 | Schindele et al. |
| 10,047,726 B2 | 8/2018 | Sakaguchi |
| 10,352,795 B2 | 7/2019 | De Bauw et al. |
| 10,473,708 B2 | 11/2019 | Izal et al. |
| 10,519,935 B2 | 12/2019 | Sakaguchi et al. |
| 10,570,887 B2 | 2/2020 | Son et al. |
| 10,590,915 B2 | 3/2020 | Takahashi |
| 10,655,607 B2 | 5/2020 | Potter et al. |
| 2011/0140439 A1 | 6/2011 | Ramanujam |
| 2012/0219418 A1 | 8/2012 | Ingerslew et al. |
| 2014/0367967 A1* | 12/2014 | Ossyra .................. F03D 7/0248 290/44 |
| 2015/0134189 A1 | 5/2015 | Wash |
| 2016/0187226 A1 | 6/2016 | Tsutsui et al. |
| 2017/0260968 A1 | 9/2017 | Tsutsui et al. |
| 2018/0224324 A1 | 8/2018 | Ikeda et al. |
| 2018/0328345 A1 | 11/2018 | Rogg |
| 2019/0033169 A1 | 1/2019 | Kamiya et al. |
| 2019/0101103 A1 | 4/2019 | Haseba et al. |
| 2019/0128243 A1 | 5/2019 | Hasan et al. |
| 2019/0195192 A1 | 6/2019 | Takahashi |
| 2020/0025648 A1 | 1/2020 | Haseba |
| 2020/0158562 A1 | 5/2020 | Hatakeyama et al. |

FOREIGN PATENT DOCUMENTS

| | | |
|---|---|---|
| CN | 108386324 A | 8/2018 |
| CN | 108757340 A | 11/2018 |
| CN | 110132581 A | 8/2019 |
| CN | 110174264 A | 8/2019 |
| EP | 2115412 A2 | 11/2009 |
| EP | 2431714 A1 | 3/2012 |
| EP | 2992209 A1 | 3/2016 |
| EP | 3168463 A1 | 5/2017 |
| WO | WO2015/012124 A1 | 1/2015 |
| WO | WO2016/091945 A1 | 6/2016 |
| WO | WO2017/163839 A1 | 9/2017 |

OTHER PUBLICATIONS

Artigao et al., The Use of Electrical Measurements of Wind Turbine Generators for Drive Train Condition Monitoring, Design Optimization of Wind Energy Conversion Systems with Applications, INTECHOPEN, 2020, 26 Pages. (Abstract Only) https://www.intechopen.com/books/design-optimization-of-wind-energy-conversion-systems-with-applications/the-use-of-electrical-measurements-of-wind-turbine-generators-for-drive-train-condition-monitoring.

Asgari et al., Robust Model-Based Fault Diagnosis of Mechanical Drive Train in V47/660 kW Wind Turbine, Springer Link, Energy Systems, vol. 9, 2018, pp. 921-952. (Abstract Only). https://link.springer.com/article/10.1007%2Fs12667-017-0231-2.

Chammas et al., Fault Diagnosis of Wind Turbine Drive Train Faults Based on Dynamical Clustering, IEEE Explore, 52$^{nd}$ IEEE Conference on Decision and Control, Dec. 10-13, 2013, Firenze Italy, pp. 5650-5655. (Abstract Only) https://doi.org/10.1109/CDC.2013.6760779.

Jiang et al., Research of Electromechanical Simulation Model of Wind Turbine Drive Train Fault Diagnosis, CNKI, 1 Page. (Abstract Only) http://en.cnki.com.cn/Article_en/CJFDTotal-DJKZ201607012.htm.

Kallstrom, On-Board Feature Extraction for Clutch Slippage Deviation Detection, Lulea University of Technology, Licentiate Thesis, 2015, 116 Pages. http://www.diva-portal.org/smash/get/diva2:999832/FULLTEXT01.pdf.

Li et al., Fault Diagnosis of Wind Turbine Drive Train Using Time-Frequency Estimation and CNN, IEEE Explore 8942851, 2019 Prognostics and System Health Management Conference (PHM—Qingdao), Qingdao China, 2019, 3 Pages. (Abstract Only) https://ieeexplore.org/document/8942851.

Liu et al., Research on Fault Diagnosis of Drive Train in Wind Turbine Based on EMD and LSSVM, Advanced Materials Research, vol. 512-515, 2012, pp. 763-770. (Abstract Only) https://www.scientific.net/AMR.512-515.763 https://doi.org/10.4028/www.scientific.net/AMR.512-515.763.

Maheswari, Fault Diagnostics of Wind Turbine Drive-Train Using Multivariate Signal Processing, International Journal of Acoustics and Vibration, vol. 24, No. 2, 2019, pp. 334-342. https://pdfs.semanticscholar.org/fd95/dec2d5e02bd375c4e23a471def9ee65821d4.pdf.

Nirosha et al., Condition Monitoring of Arrow Dynamic and Drive Train in Wind Turbine Using Artificial Intelligence, International Journal of Computer Science and Engineering Communications (IJCSEC), vol. 2, Issue 3, May 2014, 4 Pages. http://www.hindex.org/2014/1V2I3399402.pdf.

Romero et al., Condition Monitoring of a Wind Turbine Drive Train Based on its Power Dependent Vibrations, Renewable Energy, vol. 123, Aug. 2018, pp. 817-827. (Abstract Only) https://www.sciencedirect.com/science/article/abs/pii/S0960148117307139.

Shi et al., Fault Diagnosis Simulation Model Study of Wind Turbine Drive Train Based on SIMULINK, 22788, International Power, Electronics and Materials Engineering Conference (IMPEMEC 2015), Atlantis Press, Advances in Engineering Research, May 2015, 5 Pages. https://www.atlantis-press.com/proceedings/ipemec-15/22788 https://dx.doi.org/10.2991/ipemec-15.2015.81.

Shi et al., OFFSHORE 2015, European Wind Energy Association (EWEA), Conference Programme, Bella Center Copenhagen Denmark, Mar. 10-12, 2 Pages. (Abstract Only) http://www.ewea.org/offshore2015/conference/programme/info2.php?id2=266&id=26%20ordre=9#top.

Wilkinson et al., Extracting Condition Monitoring Information from a Wind Turbine Drive Train, IEEE Explore, 39$^{th}$ International Universities Power Engineering Conference, vol. 1, UPEC 2004, Bristol UK, 2004, pp. 591-594. (Abstract Only) https://ieeexplore.org/abstract/document/1492088.

Yang et al., Condition Monitoring and Fault Diagnosis of a Wind Turbine Synchronous Generator Drive Train, IET Renewable Power Generation, 20080006, The Institution of Engineering and Technology, vol. 3, No. 1, Apr. 2009, pp. 1-11. https://www.researchgate.net/deref/http%3A%2F%2Fdx.doi.org%2F10.1049%2Fiet-rpg%3A20080006.

Yang, Condition Monitoring the Drive Train of a Direct Drive Permanent Magnet Wind Turbine Using Generator Electrical Signals, Journal of Solar Energy Engineering, 021008-379726, vol. 136, Issue 2, May 2014, 8 Pages. (Abstract Only) https://

(56) References Cited

OTHER PUBLICATIONS asmedigitalcollection.asme.org/solarenergyengineering/article-abstract/136/2/021008/379726/Condition-Monitoring-the-Drive-Train-of-a-Direct.

Yang et al., Sparse Time-Frequency Representation for Incipient Fault Diagnosis of Wind Turbine Drive Train, IEEE Xplore, IEEE Transactions on Instrumentation and Measurement, vol. 67, No. 11, Nov. 2018, pp. 2616-2627. (Abstract Only) https://ieeexplore.ieee.org/abstract/document/8361776.

Yu, Wind Turbine Data Analytics for Drive-Train Failure Early Detection and Diagnostics, ASME 2011 Turbo Expo, Turbine Technical Conference and Exposition, GT2011-45101, vol. 1: Aircraft Engine; Ceramics; Coal, Biomass and Alternative Fuels; Wind Turbine Technology, Vancouver British Columbia Canada, Jun. 6-10, 2011, pp. 721-728. (Abstract Only) https://doi.org/10.1115/GT2011-45101.

The European Search Report for EP application No. 22170050.3, dated Sep. 13, 2022.

\* cited by examiner

SYSTEM AND METHOD FOR SLIP DETECTION AND SURFACE HEALTH MONITORING IN A SLIP COUPLING OF A ROTARY SHAFT

FIELD

The present disclosure relates generally to wind turbine power systems, and, more particularly, to systems and methods for slip detection and health monitoring in a slip coupling of a wind turbine power system.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and the rotor blade to allow for rotation about a pitch axis. The rotor blades capture kinetic energy of wind using known airfoil principles. The rotor blades transmit the kinetic energy in the form of rotational energy so as to turn a rotor shaft, often referred to as a low-speed shaft, coupling the rotor blades to a gearbox, or if a gearbox is not used, directly to the generator. The generator then converts the mechanical energy to electrical energy that may be deployed to a utility grid.

More specifically, in certain wind turbines, the hub is rotatably coupled to the generator via a rotor shaft (sometimes referred to as either a main shaft or a low speed shaft), the gearbox, a high-speed shaft, and a slip coupling. Thus, rotation of rotor shaft rotatably drives the gearbox that subsequently drives the high-speed shaft. The high-speed shaft rotatably drives the generator with the slip coupling and rotation of high-speed shaft facilitates production of electrical power by the generator.

Grid fault events (such as low-voltage ride through (LVRT) grid events) and/or any other transients on the wind turbine drivetrain excite shaft torsional oscillations and create large torsional stresses on the drivetrain. To reduce the effect of these transient torques, the slip coupling is provided on the high-speed shaft of the drivetrain, which slips when torque exceeds a limit value and helps to reduce shock on the system.

Existing slip detection of the slip coupling is determined using the difference between the rotor speed and the generator speed as measured by speed sensors, which typically requires two sensors on both sides of the slip coupling. However, such methods have reduced accuracy, e.g., due to the low accuracy of the rotor speed sensor, thereby leading to false positives. Moreover, such methods can take longer than desired to get accurate readings from the rotor speed sensor so as to reduce the false positives and hence takes more time to trip the turbine from the instant of slip. Any slip fault related to the shaft coupling that is triggered in the field requires visual inspection to check the cause of the fault. Slip faults which are not actual slip events and should not have led to a wind turbine shut down can cause a significant loss in power production and incurs considerable services costs.

Therefore, in view of the aforementioned, systems and methods for slip detection and friction surface health monitoring in the slip coupling of a wind turbine power system would be welcomed in the art. Thus, the present disclosure is directed to systems for detecting slippage of the slip coupling (particularly during LVRT events or triggered wind gusts) and prognostics of the coupling friction surface using signals from generator and drivetrain.

BRIEF DESCRIPTION

Aspects and advantages of the disclosure will be set forth in part in the following description, or may be obvious from the description, or may be learned through practice of the disclosure.

In an aspect, the present disclosure is directed to a method for operating a drivetrain having a generator and a shaft. The shaft also has a slip coupling mounted thereon. Thus, the method includes generating, via a controller, a time series of a plurality of operating signals of the generator. The method also includes applying at least one algorithm to the time series of the plurality of operating signals of the generator to generate a processed time series of the of the plurality of operating signals of the generator. Moreover, the method includes identifying, via the controller, patterns in the processed time series of the plurality of operating signals of the generator to identify either of a slip event occurring in the slip coupling or a surface health of the slip coupling. Further, the method includes implementing, via the controller, a control action when the slip event occurring in the slip coupling is identified or the surface health of the slip coupling is indicative of degradation in the slip coupling.

In an embodiment, for example, the plurality of operating signals may include generator speed, rotor speed, generator current, or generator voltage.

Thus, in an embodiment, applying the algorithm(s) to the time series of the plurality of operating signals of the generator to generate the processed time series of the of the plurality of operating signals of the generator may include determining a second derivative of the generator speed and comparing the second derivative with a threshold to identify the slip event occurring in the slip coupling.

In another embodiment, the method may include estimating an electromagnetic torque of the generator as a function of the generator current and the generator voltage, estimating a shaft torque of the generator using the electromagnetic torque of the generator and the generator speed, and estimating a coupling torque of the generator using the shaft torque.

As such, in an embodiment, applying the algorithm(s) to the time series of the plurality of operating signals of the generator to generate the processed time series of the of the plurality of operating signals of the generator may include estimating a first derivative of the shaft torque of the generator and comparing the first derivative with a threshold to identify the slip event occurring in the slip coupling.

In further embodiments, applying the algorithm(s) to the time series of the plurality of operating signals of the generator to generate the processed time series of the of the plurality of operating signals of the generator may include identifying a certain frequency pattern of rotor current to identify the slip event occurring in the slip coupling.

In additional embodiments, applying the algorithm(s) to the time series of the plurality of operating signals of the generator to generate the processed time series of the of the plurality of operating signals of the generator may include utilizing at least one of one or more artificial neural networks and one more classification techniques and at least one of the generator speed, the shaft torque of the generator, and an instantaneous frequency of the rotor current to identify the slip event occurring in the slip coupling.

In certain embodiments, for example, utilizing the one or more artificial neural networks and/or the one more classification techniques and the generator speed, the shaft torque of the generator, and/or the instantaneous frequency of the rotor current to identify the slip event occurring in the slip coupling may include receiving the time series of the plurality of operating signals of the generator and analyzing the time series of the plurality of operating signals of the generator using the one or more artificial neural networks to extract one or more low-dimensional features corresponding to multi-variate time-series windows.

In particular embodiments, the artificial neural network(s) may include, for example, a temporal convolutional network or a long short-term memory (LSTM) neural network.

In several embodiments, utilizing the one or more artificial neural networks and/or the one more classification techniques and the generator speed, the shaft torque of the generator, and/or the instantaneous frequency of the generator current to identify the slip event occurring in the slip coupling may include receiving the time series of the plurality of operating signals of the generator and estimating a pattern of one or more divergences from a normal pattern in the time series of the plurality of operating signals of the generator.

In another embodiment, applying the algorithm(s) to the time series of the plurality of operating signals of the generator to generate the processed time series of the of the plurality of operating signals of the generator may include analyzing at least one of the time series of the plurality of operating signals of the generator or a time series of the shaft torque of the generator along with one or more optional wind parameters at a start of a slip event using one or more artificial neural networks to extract one or more low-dimensional features corresponding to multi-variate time-series windows and trending one or more divergences of the one or more low-dimensional features from a normal condition feature set.

In alternative embodiments, applying the algorithm(s) to the time series of the plurality of operating signals of the generator to generate the processed time series of the of the plurality of operating signals of the generator may include analyzing at least one of the time series of the plurality of operating signals of the generator or the time series of the shaft torque of the generator along with one or more optional wind parameters at a start of the slip event by comparing the shaft torque or a coupling torque at the start of the slip event to a threshold.

In further embodiments, identifying the patterns in the processed time series of the plurality of operating signals of the generator to identify either of the slip event occurring in the slip coupling or the surface health of the slip coupling may include utilizing the one or more low-dimensional features and one or more historical loading conditions to identify the surface health of the slip coupling using one or more Bayesian models.

In additional embodiments, identifying the patterns in the processed time series of the plurality of operating signals of the generator to identify either of the slip event occurring in the slip coupling or the surface health of the slip coupling may include analyzing the time series of a plurality of operating signals of the generator at a start of a slip event using one or more artificial neural networks to extract one or more low-dimensional features corresponding to multi-variate time-series window.

In certain embodiments, the method may further include estimating an energy dissipation and a temperature rise based on the shaft torque, the rotor speed, and the generator speed during one or more slip events and trending the energy dissipation and the temperature rise to determine an accumulated degradation of the surface health of the slip coupling.

In particular embodiments, the drivetrain may be part of a wind turbine.

In another aspect, the present disclosure is directed to a method for operating a generator of a wind turbine. The wind turbine has a hub rotatably coupled to the generator via a rotor shaft that rotatably drives a gearbox that subsequently drives a generator shaft having a slip coupling. The method includes generating, via a controller, a time series of a plurality of operating signals of the generator. The method also includes applying at least one algorithm to the time series of the plurality of operating signals of the generator to generate a processed time series of the of the plurality of operating signals of the generator. Further, the method includes identifying, via the controller, patterns in the processed time series of the plurality of operating signals of the generator to estimate torque information relating to the generator shaft. Thus, the method includes predicting a start of a slip event occurring in the slip coupling using the torque information relating to the generator shaft. Moreover, the method includes controlling a power converter of the wind turbine to mitigate the slip event.

In yet another aspect, the present disclosure is directed to a system for operating a generator of a wind turbine. The wind turbine has a hub rotatably coupled to the generator via a rotor shaft that rotatably drives a gearbox that subsequently drives a generator shaft having a slip coupling. The system includes a controller comprising at least one processor. The processor(s) is configured to implement a plurality of operations, including but not limited to generating a time series of a plurality of operating signals of the generator, applying at least one algorithm to the time series of the plurality of operating signals of the generator to generate a processed time series of the of the plurality of operating signals of the generator, identifying patterns in the processed time series of the plurality of operating signals of the generator to identify a start of at least one slip event occurring in the slip coupling or surface health degradation of the slip coupling, and implementing a control action when the at least one slip event occurring in the slip coupling is identified or the surface health of the slip coupling is indicative of degradation in the slip coupling.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield vet further embodiments. It is intended that the present disclosure includes such modifications and variations.

Generally, the present disclosure is directed to systems and methods for slip detection and friction surface health monitoring in the slip coupling of a wind turbine power system. In particular, in an embodiment, systems and methods of the present disclosure utilize the coupling torque and the shaft toque at the instant of slipping and trend these values over time to detect surface health degradation. Thus, the present disclosure is advantageous as there is a high probability that the coupling surfaces degrade much before the surfaces finish the predefined number of slip rotations and hence creates slip events even at lower torque levels and increases chances of catastrophic damages. In addition, the present disclosure provides a slip detection method that uses high-fidelity signals from the generator to detect slip which runs in controller at a faster rate. As such, the present disclosures provides a method that helps detecting slip more accurately (i.e., without using low accuracy rotor speed sensor information) at faster rate. Moreover, the systems and methods of the present disclosure provide for coupling friction surface health monitoring. In particular, in an embodiment, the present disclosure uses the estimated shaft torque at the instant of slipping (slipping torque) and provides a direct measurement of the degradation of coupling friction surface. This along with energy dissipated in the slipping process can be trended over time to estimate the remaining useful life (RUL) of the bearing.

Figure 1:
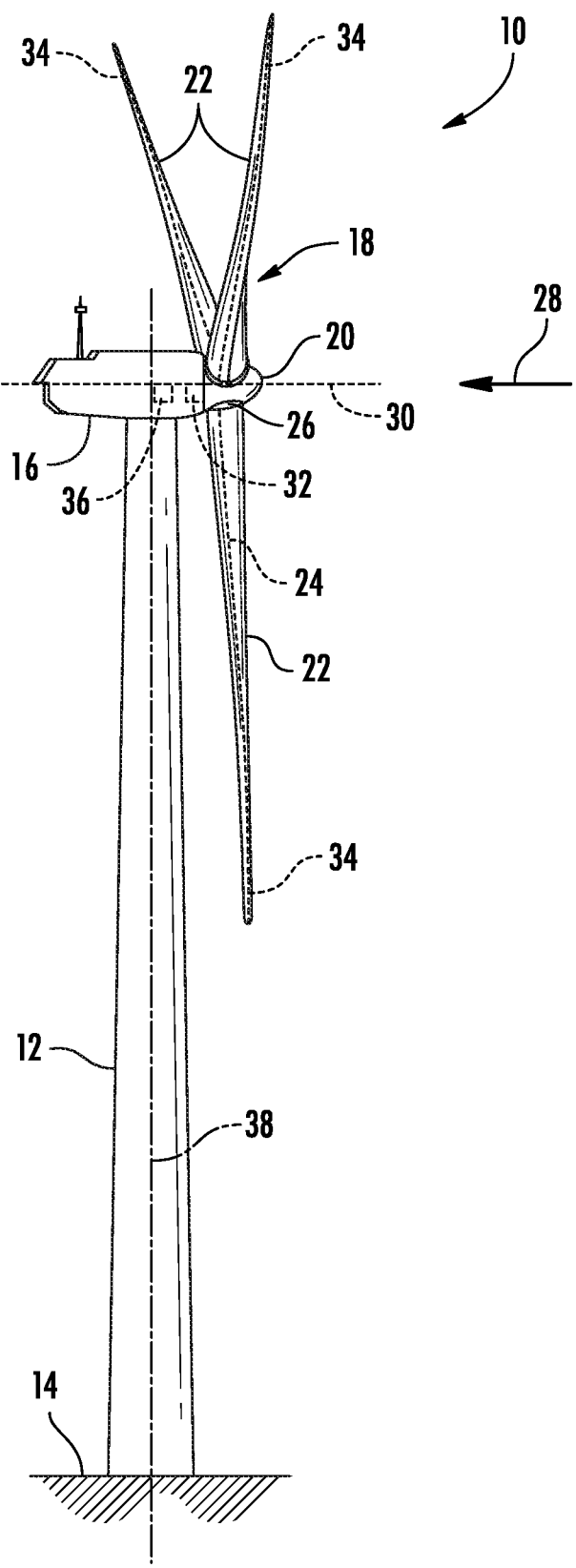
FIG. 1 illustrates a perspective view of one embodiment of a wind turbine according to the present disclosure.

Referring now to the drawings, FIG. 1 illustrates a perspective view of one embodiment of a wind turbine 10 according to the present disclosure. In the illustrated embodiment, the wind turbine 10 is a horizontal-axis wind turbine. Alternatively, the wind turbine 10 may be a vertical-axis wind turbine. In addition, as shown, the wind turbine 10 includes a tower 12 that extends from a support system 14, a nacelle 16 mounted on tower 12, and a rotor 18 that is coupled to nacelle 16. The rotor 18 includes a rotatable hub 20 and at least one rotor blade 22 coupled to and extending outward from hub 20. Moreover, as shown, the rotor 18 has three rotor blades 22. In an alternative embodiment, the rotor 18 includes more or less than three rotor blades 22. In an embodiment, the tower 12 is fabricated from tubular steel to define a cavity (not shown in FIG. 1) between support system 14 and nacelle 16. In an alternative embodiment, the tower 12 is any suitable type of tower having any suitable height.

The rotor blades 22 are spaced about the hub 20 to facilitate rotating the rotor 18 to enable kinetic energy to be transferred from the wind into usable mechanical energy, and subsequently, electrical energy. Further, the rotor blades 22 are generally secured to the hub 20 by coupling a blade root portion 24 to the hub 20 at a plurality of load transfer regions 26. The load transfer regions 26 have a hub load transfer region and a blade load transfer region (both not shown in FIG. 1). As such, loads induced to the rotor blades 22 are transferred to the hub 20 via the load transfer regions 26.

Thus, as wind strikes the rotor blades 22 from a direction 28, the rotor 18 is rotated about an axis of rotation 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle or blade pitch of the rotor blades 22, i.e., an angle that determines a perspective of the rotor blades 22 with respect to the direction 28 of the wind, may be changed by a pitch adjustment system 32 to control the load and power generated by the wind turbine 10 by adjusting an angular position of at least one rotor blade 22 relative to wind vectors. Pitch axes 34 for the rotor blades 22 are shown. During operation of the wind turbine 10, the pitch adjustment system 32 may change a blade pitch of the rotor blades 22 such that the rotor blades 22 are moved to a feathered position, such that the perspective of at least one rotor blade 22 relative to wind vectors provides a minimal surface area of the rotor blade 22 to be oriented towards the wind vectors, which facilitates reducing a rotational speed of the rotor 18 and/or facilitates a stall of the rotor 18.

In one embodiment, a blade pitch of each rotor blade 22 is controlled individually by a controller 36. Alternatively, the blade pitch for all rotor blades 22 may be controlled simultaneously by the controller 36. Further, in an embodiment, as the direction 28 changes, a yaw direction of the nacelle 16 may be controlled about a yaw axis 38 to position the rotor blades 22 with respect to the direction 28.

In an embodiment, the controller 36 is shown as being centralized within the nacelle 16, however, the controller 36 may be a distributed system throughout the wind turbine 10, on the support system 14, within a wind farm, and/or at a remote control center.

Figure 2:
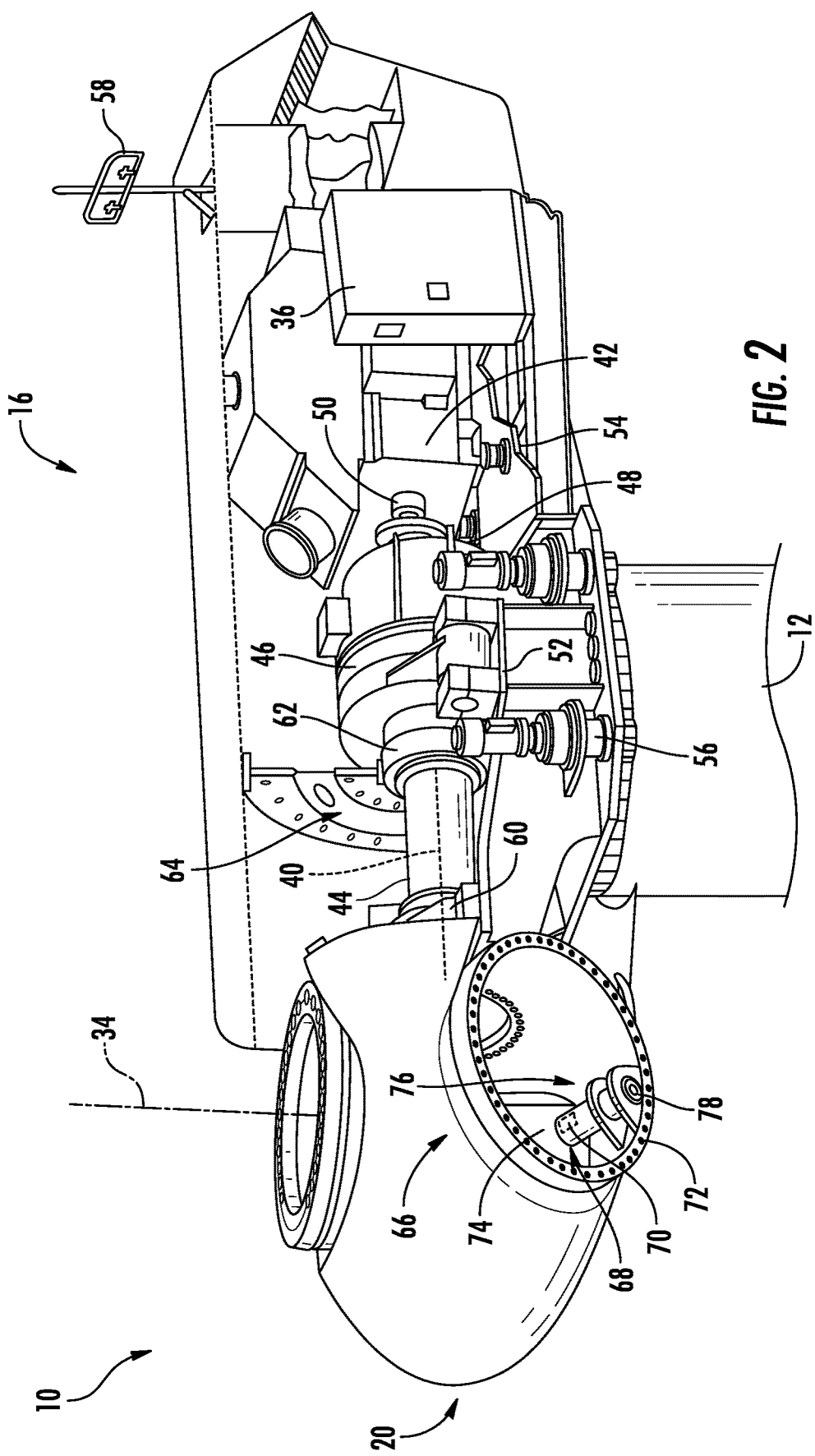
FIG. 2 illustrates an enlarged sectional view of a portion of the wind turbine shown in FIG. 1.

Referring now to FIG. 2, an enlarged sectional view of a portion of the wind turbine 10 is illustrated according to the present disclosure. In an embodiment, the hub 20 is rotatably coupled to a generator 42 positioned within the nacelle 16 by rotor shaft 44 (sometimes referred to as either a main shaft or a low speed shaft), a gearbox 46, a high-speed shaft 48, and a coupling 50. In an embodiment, the rotor shaft 44 is disposed coaxial to longitudinal axis 40. Rotation of the rotor shaft 44 rotatably drives the gearbox 46 that subsequently drives the high-speed shaft 48. The high-speed shaft 48 rotatably drives the generator 42 with the coupling 50 and rotation of the high-speed shaft 48 facilitates production of electrical power by the generator 42. The gearbox 46 and the generator 42 are supported by supports 52, 54. Further, in an embodiment, the gearbox 46 utilizes a dual path geometry to drive the high-speed shaft 48. Alternatively, the rotor shaft 44 is coupled directly to the generator 42 with the coupling 50.

The nacelle 16 also includes a yaw drive mechanism 56 that may be used to rotate the nacelle 16 and the hub 20 on a yaw axis 38 (shown in FIG. 1) to control the perspective of rotor blades 22 with respect to direction 28 of the wind. The nacelle 16 also includes at least one meteorological mast 58 that includes a wind vane and anemometer (neither shown in FIG. 2). As such, in an embodiment, the mast 58 provides information to the controller 36 that may include wind direction and/or wind speed. In addition, as shown in the illustrated embodiment, the nacelle 16 also includes a main forward support bearing 60 and a main all support bearing 62.

Still referring to FIG. 2, the forward support bearing 60 and the aft support bearing 62 facilitate radial support and alignment of the rotor shaft 44. The forward support bearing 60 is coupled to the rotor shaft 44 near the hub 20. The aft support bearing 62 is positioned on the rotor shaft 44 near the gearbox 46 and/or the generator 42. Alternatively, the nacelle 16 includes any number of support bearings that enable the wind turbine 10 to function as disclosed herein. The rotor shaft 44, the generator 42, the gearbox 46, the high-speed shaft 48, the coupling 50, and/or any associated fastening, support, and/or securing device including, but not limited to, the supports 52, 54, and the forward support bearing 60 and aft support bearing 62, are sometimes referred to as a drive train 64, in the example as geared drive train.

In other examples, the geared drive train 64 is replaced by a direct-drive train. For example, a comparatively long main shaft connects the hub 20 and the generator 42. The main shaft 44 and the generator shaft 48 are typically coupled via a conical sleeve coupling. The main shaft 44 is typically supported by a front bearing, for example a spherical roller bearing, next to the hub 20 and a rear bearing, for example a CARB bearing, next to the generator 42. The front bearing and the rear bearing are connected to a bedplate and configured to transfer axial loads and bending loads to the bedplate mounted to nacelle 16. The generator 42 is hanging on the main shaft 44. Further torque beams may be provided between the generator 42 and the bedplate to transfer torque to the bedplate during operation of the wind turbine 10.

In an embodiment, the hub 20 may also include a pitch assembly 66. For example, as shown in FIG. 2, the pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In an embodiment, the pitch assembly 66 includes at least one pitch bearing 72 coupled to the hub 20 and to the respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to the pitch drive pinion 78 such that the rotation of the pitch drive pinion 78 causes rotation of the pitch bearing 72. More specifically, in an embodiment, the pitch drive pinion 78 is coupled to the pitch bearing 72 such that rotation of the pitch drive gearbox 76 rotates the pitch bearing 72 and the rotor blade 22 about the pitch axis 34 to change the blade pitch of the rotor blade 22. Further, the pitch drive system 68 is coupled to the controller 36 for adjusting the blade pitch of the rotor blade(s) 22 upon receipt of one or more signals from the controller 36.

Figure 3:
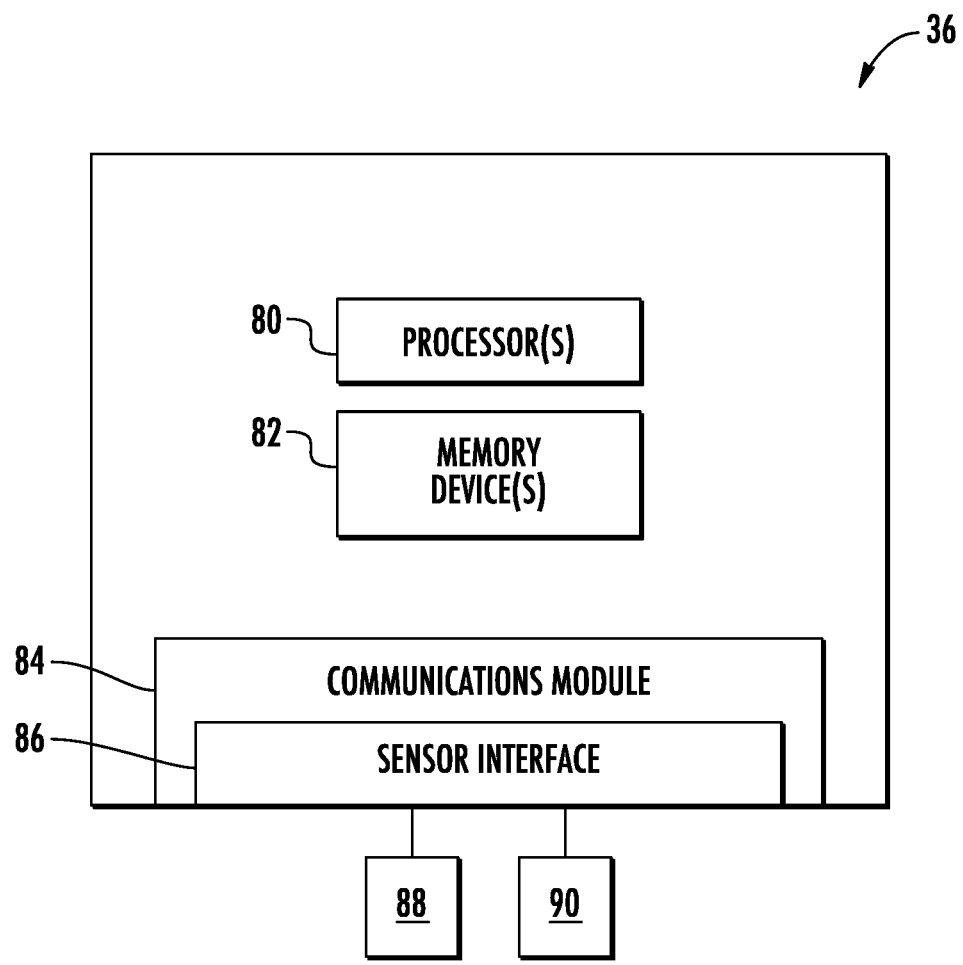
FIG. 3 illustrates a block diagram of one embodiment of suitable components that may be included in a controller of a wind turbine according to the present disclosure.

Referring now to FIG. 3, a block diagram of one embodiment of suitable components that may be included within the controller 36 in accordance with aspects of the present disclosure is illustrated. It should be understood that the various components of the controller of FIG. 3 may be applicable to any suitable controller, including for example, a turbine controller, a farm-level controller, a supervisory controller, and/or other suitable control system.

As shown, the controller 36 may include one or more processor(s) 80 and associated memory device(s) 82 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 82 may generally include memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Additionally, the controller 36 may also include a communications module 84 to facilitate communications between the controller 36 and the various components of the wind turbine 10. For instance, the communications module 84 may include a sensor interface 86 (e.g., one or more analog-to-digital converters) to permit the signals transmitted by one or more sensors 88, 90 to be converted into signals that can be understood and processed by the controller 36. It should be appreciated that the sensors 88, 90 may be communicatively coupled to the communications module 84 using any suitable means. For example, as shown in FIG. 3, the sensors 88, 90 are coupled to the sensor interface 86 via a wired connection. However, in other embodiments, the sensors 88, 90 may be coupled to the sensor interface 86 via a wireless connection, such as by using any suitable wireless communications protocol known in the art. As such, the processor 80 may be configured to receive one or more signals from the sensors 88, 90.

The sensors 88, 90 of the wind turbine 10 may be any suitable sensors configured to measure any operational condition and/or wind parameter at or near the wind turbine 10. For example, the sensors 88, 90 may include blade sensors for measuring a pitch angle of one of the rotor blades 22 or for measuring a loading acting on one of the rotor blades 22; generator sensors for monitoring the generator 42 (e.g., torque, rotational speed, acceleration and/or the power output); and/or various wind sensors for measuring various wind parameters. In addition, the sensors 88, 90 may be located near the ground of the wind turbine 10, on the nacelle 16, and/or on the meteorological mast 58.

It should also be understood that any other number or type of sensors may be employed and at any location. For example, the sensors 88, 90 may be analog sensors, digital sensors, optical/visual sensors, accelerometers, pressure sensors, angle of attack sensors, vibration sensors, MIMU sensors, fiber optic systems, temperature sensors, wind sensors, Sonic Detection and Ranging (SODAR) sensors, infra lasers, Light Detecting and Ranging (LIDAR) sensors, radiometers, pitot tubes, rawinsondes, and/or any other suitable sensors. It should be appreciated that, as used herein, the term "monitor" and variations thereof indicate that the various sensors of the wind turbine may be configured to provide a direct measurement of the parameters being monitored or an indirect measurement of such parameters. Thus, the sensors 88, 90 may, for example, be used to generate signals relating to the parameter being monitored, which can then be utilized by the controller to determine the actual condition.

Figure 4:
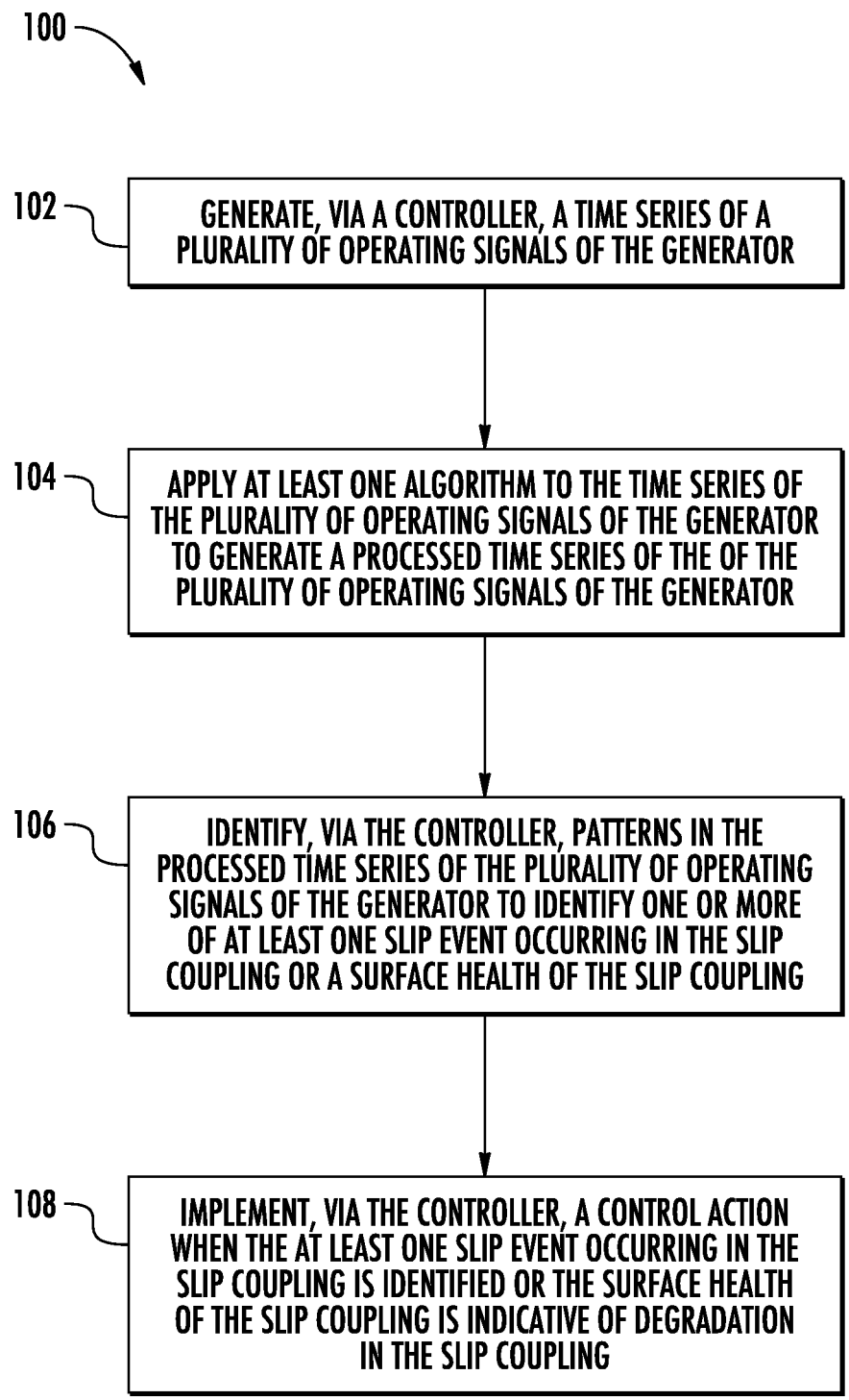
FIG. 4 illustrates a flow diagram of one embodiment of a method for operating a generator of a wind turbine according to the present disclosure.

Referring now to FIGS. 4-9, the present disclosure is directed to a method 100 and a system 200 for operating a generator of a wind turbine, such as wind turbine 10. In general, the method 100 will be described herein with reference to the wind turbine 10 described above with reference to FIGS. 1-3. However, it should be appreciated by those of ordinary skill in the art that the disclosed method 100 may generally be utilized with any wind turbine having any suitable configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Figure 5:
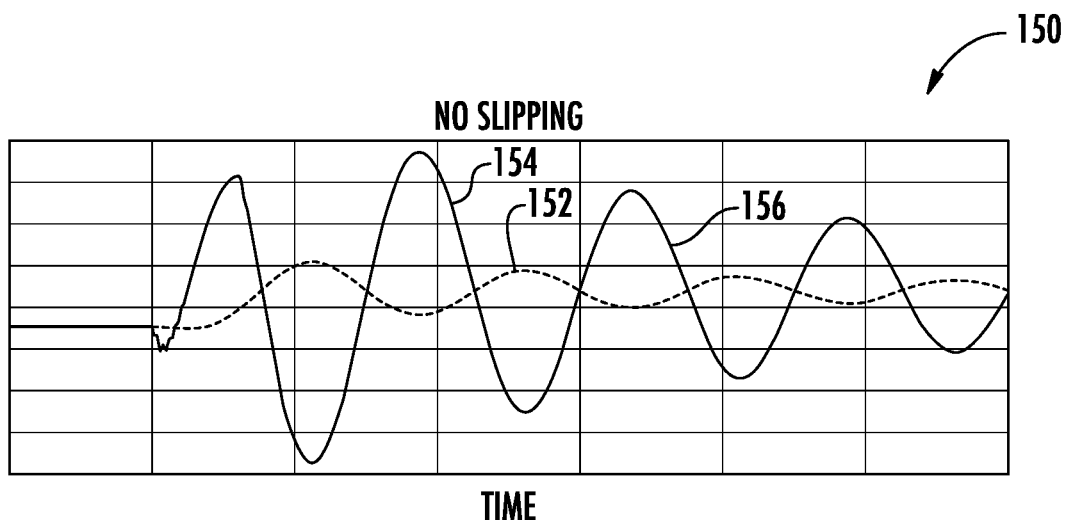
FIG. 5 illustrates a graph of one embodiment of a time series for turbine/rotor speed, gearbox speed, and generator speed where no slip is present according to the present disclosure.
Figure 6:
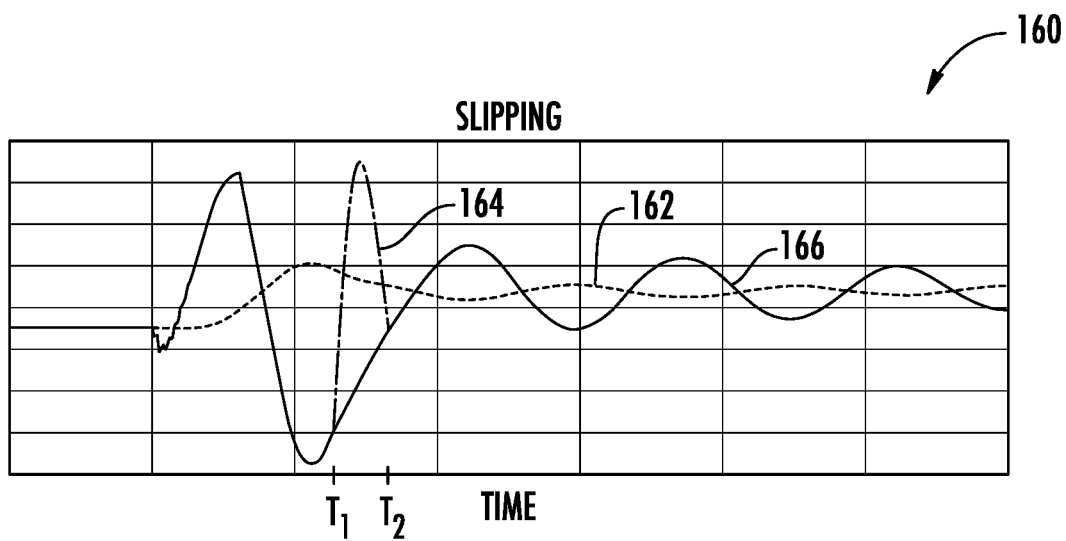
FIG. 6 illustrates a graph of one embodiment of a time series for turbine/rotor speed, gearbox speed, and generator speed where slippage is present according to the present disclosure.

As shown at (102), the method 100 includes generating, via a controller 36, a time series of a plurality of operating signals of the generator 42. For example, in an embodiment, the plurality of operating signals may include generator speed, rotor speed, generator current, or generator voltage and/or functions thereof. Moreover, in particular embodiments, the operating signals may be raw measurements from one or more sensors, such as sensors 88, 90 of the wind turbine 10. In addition, or in the alternative, the method 100 may include processing operating signals using one or more processing algorithms. Examples of time series 150, 160 of turbine speed 152, 162, gearbox speed 154, 164, and generator speed 156, 166 depicting no slipping and slipping of the slip coupling 50 are provided in FIGS. 5 and 6, respectively. In particular, as shown in FIG. 5, when no slippage is present, the gearbox speed 154 and the generator speed 156 are synchronized. In contrast, as shown in FIG. 6, when slippage is present, the gearbox speed 154 and the generator speed 156 are no longer synchronized, thereby causing a slip event between $T_1$ and $T_2$.

In addition, in certain embodiments, the method 100 may include estimating an electromagnetic torque of the generator 42 as a function of the generator current and the generator voltage and estimating a shaft torque of the generator 42 using the electromagnetic torque of the generator 42 and the generator speed. More specifically, the electromagnetic torque (i.e., $T_{em}$) of the generator 42 may be calculated using Equation (1) below:

$$T_{em} = \frac{3*P}{4}(\varphi_d I_q - \varphi_q I_d) \qquad \text{Equation (1)}$$

Figure 7:
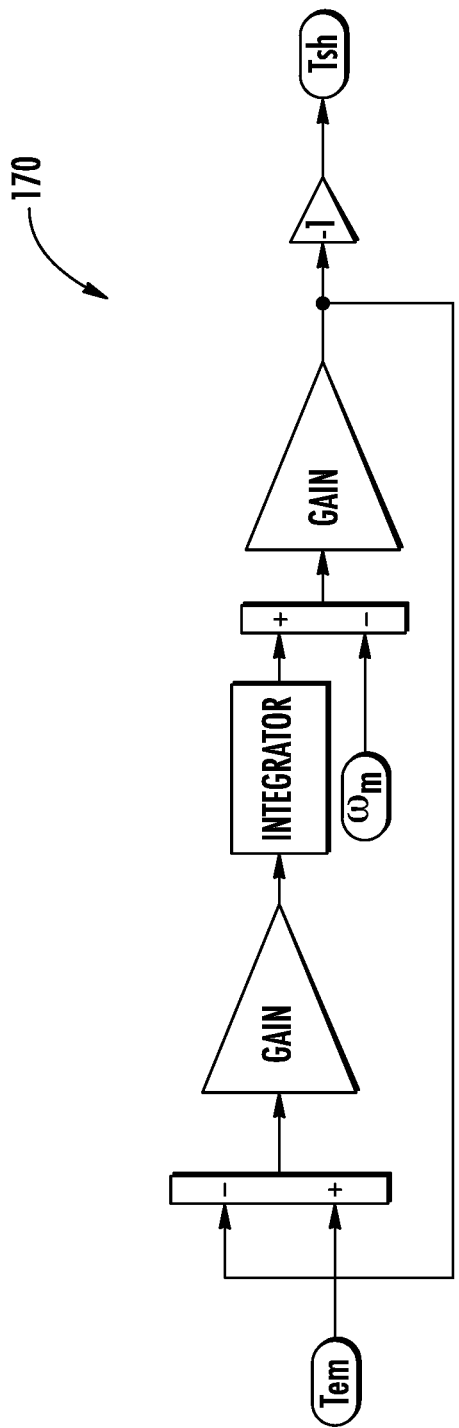
FIG. 7 illustrates a schematic diagram of one embodiment of an estimator for estimating shaft torque of a generator according to the present disclosure.

Accordingly, the shaft torque (i.e., $T_{sh}$) of the generator 42 may be estimated using the electromagnetic torque (i.e., $T_{em}$) from Equation (1) and the generator speed, using, e.g., an estimator 170 as illustrated in FIG. 7. Thus, the coupling torque (i.e., $T_{cl}$) may be calculated as a function of the shaft torque using Equation (2) below:

$$T_{cl} = \frac{J_m T_{sh} + J_g T_e + (B_m J_g - B_g J_m)w}{(J_g + J_m)} \qquad \text{Equation (2)}$$

Referring back to FIG. 4, as shown at (104), the method 100 includes applying at least one algorithm to the time series of the plurality of operating signals of the generator 42 to generate a processed time series of the of the plurality of operating signals of the generator 42. For example, in an embodiment, the controller 36 is configured to determine a second derivative of the generator speed and compare the second derivative to a threshold to identify the slip event occurring in the slip coupling 50. In further embodiments, the controller 36 is configured to estimate a first derivative of the shaft torque $T_{sh}$ of the generator 42 and compare the first derivative to a threshold to identify the slip event occurring in the slip coupling 50.

Figure 8:
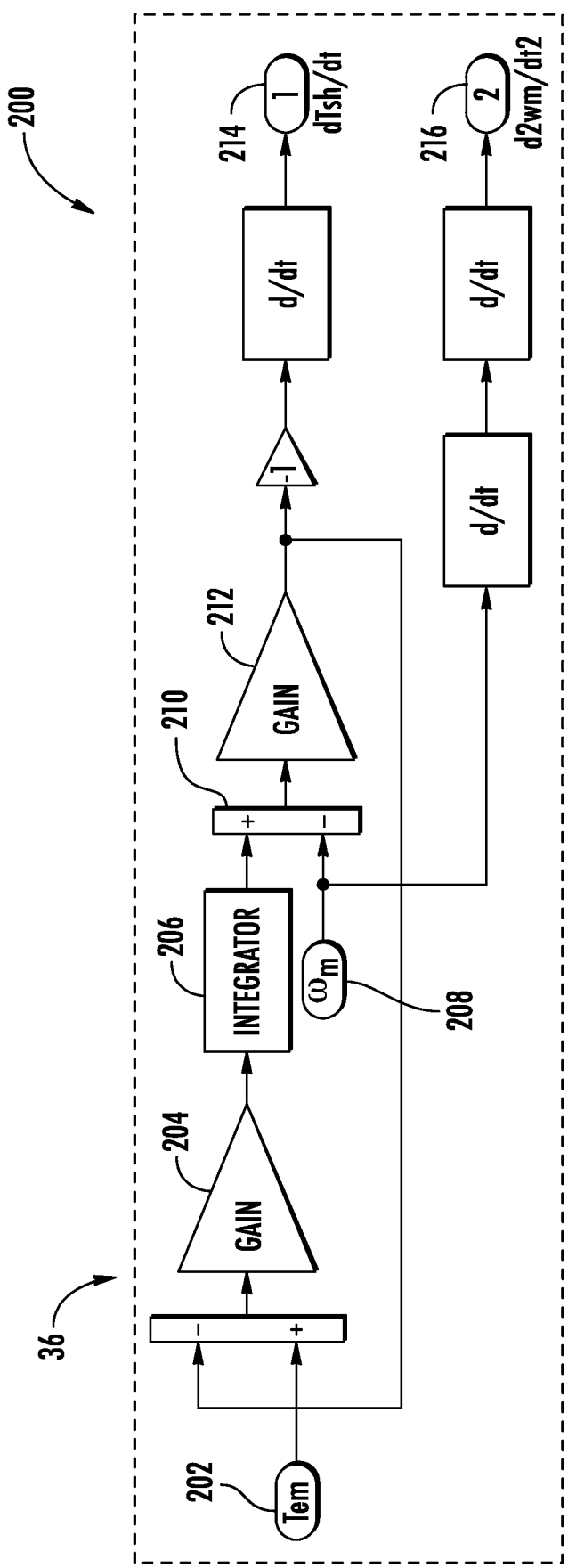
FIG. 8 illustrates a schematic diagram of one embodiment of a system for operating a generator of a wind turbine according to the present disclosure, particularly illustrating the system applying an algorithm to a time series to generate first and second derivatives of shaft torque and speed, respectively.

More particularly, as shown in FIG. 8, a schematic diagram of one embodiment of the system 200 for operating the generator 42 described herein is illustrated. As shown, the system 200 includes the controller 36, which is configured to apply the algorithm described herein to the time series of the operating signals of the generator 42. Further, as shown, the controller 36 may include various computer/software modules for implementing the algorithm described herein. Accordingly, as shown at (202), the controller 36 is configured to receive the estimated electromagnetics torque (i.e., $T_{em}$) of the generator 42. Thus, as shown at (204), the controller 36 can apply a gain and to the estimated electromagnetics torque $T_e$m. Further, as shown, the controller 36 may include an integrator 206 for integrating the output from the gain module. Moreover, as shown at (208), the controller 36 is also configured to receive the generator speed (i.e., $\omega_m$). Thus, as shown at (210), the generator speed can be compared to the output from the integrator 206. Further, as shown at (212), another gain may be applied to the output of comparator 210. Moreover, as shown at (214), the comparison can be used to estimate a first derivative (i.e., $dT_{sh}/dt$) of the shaft torque of the generator 42 with respect to time. In addition, as shown at (216), the controller 36 may be further configured to determine the second derivative (i.e., $d2\omega m/dt2$) of the generator speed with respect to time to identify the slip event occurring in the slip coupling 50.

Figure 9:
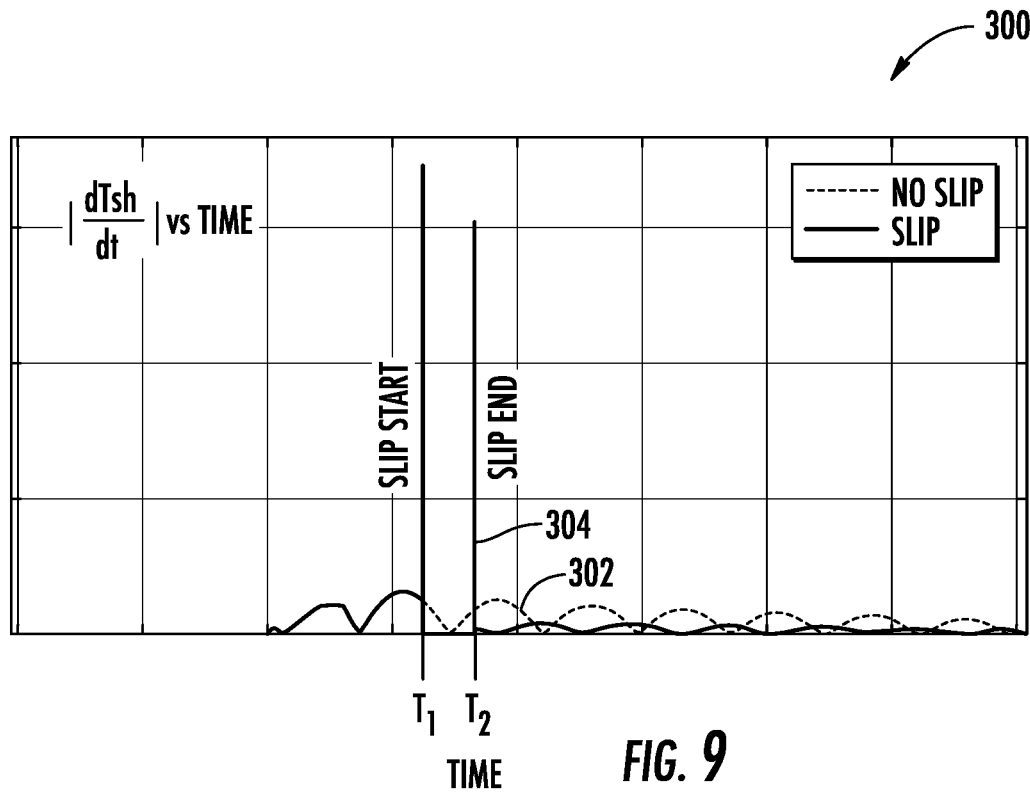
FIG. 9 illustrates a graph of one embodiment of a first derivative of torque of a generator according to the present disclosure, particularly illustrating a start and end of a slip event.
Figure 10:
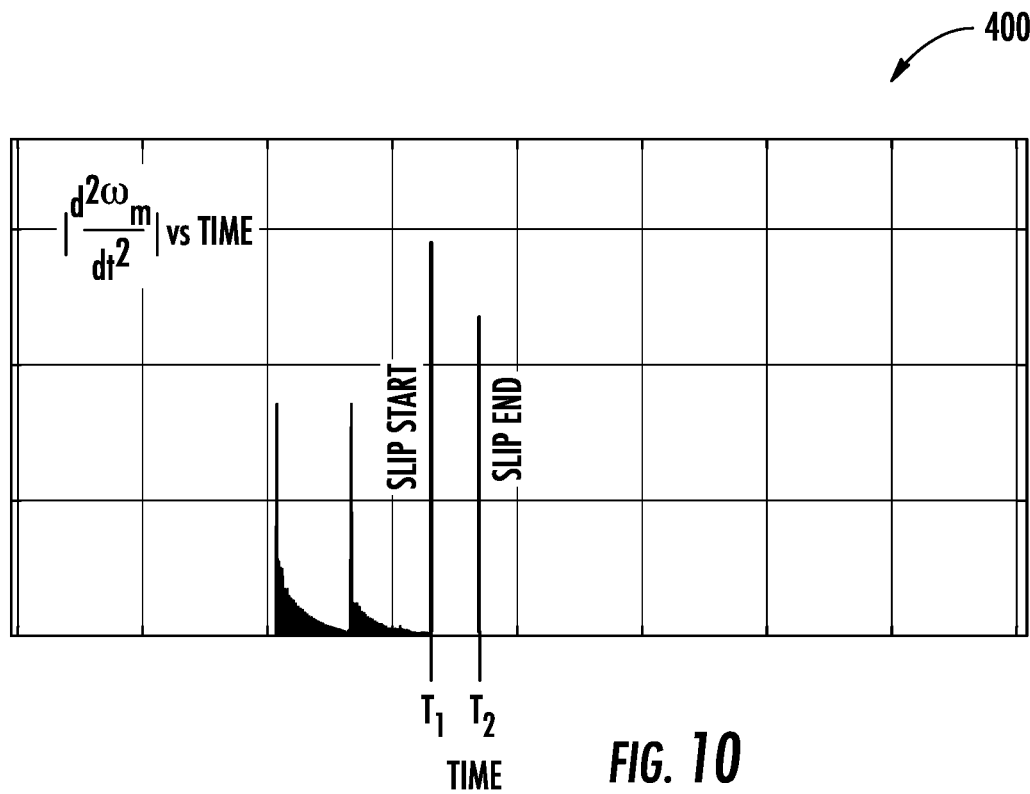
FIG. 10 illustrates a graph of one embodiment of a second derivative of speed of a generator according to the present disclosure, particularly illustrating a start and end of a slip event.

In an embodiment, for example, FIG. 9 illustrates a graph 300 of the first derivative (i.e., $dT_{sh}/dt$) of the shaft torque $T_{sh}$ of the generator 42 with respect to time according to an embodiment of the present disclosure. Thus, as shown, the shaft torque $T_{sh}$ without slip is represented by curve 302, whereas the shaft torque $T_{sh}$ with slippage is represented by curve 304. Furthermore, as shown, the start and the end of a slip event can be seen at time $T_1$ and $T_2$, respectively, as indicated by the sharp increase in the magnitude and comparing with a predefined threshold value. In addition, as shown in FIG. 10, a graph 400 of the second derivative of the generator speed (i.e., $\omega_m$) with respect to time according to an embodiment of the present disclosure is illustrated. Thus, as shown, the start and the end of the slip event can be seen at time $T_1$ and $T_2$, respectively, as indicated by the sharp increase in the magnitude and comparing with a predefined threshold value.

In another embodiment, the controller 36 may also be configured to identify a certain frequency pattern of the generator current to identify the slip event occurring in the slip coupling 50. In still further embodiments, the controller 36 may also be further configured to utilize at least one of one or more artificial neural networks and one more classification techniques and the generator speed, the shaft torque of the generator 42, and/or an instantaneous frequency of the rotor current to identify the slip event occurring in the slip coupling 50.

For example, in an embodiment, the controller 36 is configured to receive the time series of the plurality of operating signals of the generator and analyze the time series of the plurality of operating signals of the generator using the one or more artificial neural networks to extract one or more low-dimensional features corresponding to multi-variate time-series windows. In such embodiments, the artificial neural network(s) may include, for example, a temporal convolutional network, a long short-term memory (LSTM) neural network, or any other suitable neural network.

In addition, in certain embodiments, the controller 36 may also be configured to receive the time series of the plurality of operating signals of the generator and estimate a pattern of one or more divergences from a normal pattern in the time series of the plurality of operating signals of the generator 42.

In further embodiments, applying the algorithm(s) to the time series of the plurality of operating signals of the generator 42 may also include analyzing the time series of the plurality of operating signals of the generator 42 or a time series of the shaft torque of the generator 42 along with one or more optional wind parameters at a start of a slip event using one or more artificial neural networks to extract one or more low-dimensional features corresponding to multi-variate time-series windows. Thus, in such embodiments, the controller 36 is also configured to trend one or more divergences of the one or more low-dimensional features from a normal condition feature set.

Referring back to FIG. 4, as shown at (106), the method 100 includes identifying, via the controller 36, patterns in the processed time series of the plurality of operating signals of the generator 42 to identify either of a slip event occurring in the slip coupling 50 and/or a surface health of the slip coupling 50. Moreover, in an embodiment, the method 100 may include identifying patterns in the processed time series of the operating signals of the generator 42 to estimate torque information relating to the generator shaft 48. Thus, in an embodiment, the method 100 may include predicting a start of a slip event occurring in the slip coupling 50 using the torque information relating to the generator shaft 48. For example, in certain embodiments, the controller 36 may be configured to analyze the time series of a plurality of operating signals of the generator 42 at a start of a slip event using one or more artificial neural networks to extract one or more low-dimensional features corresponding to multi-variate time-series window. Thus, in an embodiment, the controller 36 may also trend one or more divergences of the low-dimensional feature(s) from a normal condition feature. In further embodiments, the method 100 may include utilizing the low-dimensional feature(s) and one or more historical loading conditions to identify the surface health of the slip coupling 50 using one or more Bayesian models.

In still further embodiments, the method 100 may include estimating an energy dissipation and a temperature rise of the generator 42 based on the shaft torque, the rotor speed, and the generator speed during one or more slip events and trending the energy dissipation and the temperature rise to determine an accumulated degradation of the surface health of the slip coupling 50. Thus, referring still to FIG. 4, as shown at (108), the method 100 includes implementing, via the controller 36, a control action when the slip event(s) occurring in the slip coupling 50 is identified and/or the surface health of the slip coupling 50 is indicative of degradation in the slip coupling 50. Such control actions may include, for example, controlling a power converter of the wind turbine to mitigate the slip event, shutting down the wind turbine, generating an alarm, derating the wind turbine, adjusting an operating parameter of the wind turbine, uprating the wind turbine, and/or scheduling a maintenance event.

Exemplary embodiments of systems for drivetrain of wind turbines are described above in detail. The systems are not limited to the specific embodiments described herein, but rather, components of the systems may be utilized independently and separately from other components described herein. Rather, an embodiment can be implemented and utilized in connection with many other rotor blade applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Various aspects and embodiments of the present invention are defined by the following numbered clauses:

Clause 1. A method for operating a drivetrain having a generator and a shaft, the shaft having a slip coupling mounted thereon, the method comprising:

receiving, via a controller, a time series of a plurality of operating signals of the generator;

applying at least one algorithm to the time series of the plurality of operating signals of the generator to generate a processed time series of the of the plurality of operating signals of the generator;

identifying, via the controller, patterns in the processed time series of the plurality of operating signals of the generator to identify either of a slip event occurring in the slip coupling or a surface health of the slip coupling; and, implementing, via the controller, a control action when the slip event occurring in the slip coupling is identified or the surface health of the slip coupling is indicative of degradation in the slip coupling.

Clause 2. The method of clause 1, wherein the plurality of operating signals comprises at least one of generator speed, rotor speed, generator current, or generator voltage.

Clause 3. The method of any of the preceding clauses, wherein applying the at least one algorithm to the time series of the plurality of operating signals of the generator to generate the processed time series of the of the plurality of operating signals of the generator further comprises:

determining a second derivative of the generator speed; and comparing the second derivative to a threshold to identify the slip event occurring in the slip coupling.

Clause 4. The method of any of the preceding clauses, further comprising:

estimating an electromagnetic torque of the generator as a function of the generator current, the generator voltage and the generator speed;

estimating a shaft torque of the generator using the electromagnetic torque of the generator and the generator speed; and estimating a coupling torque of the generator using the shaft torque.

Clause 5. The method of any of the preceding clauses, wherein applying the at least one algorithm to the time series of the plurality of operating signals of the generator to generate the processed time series of the of the plurality of operating signals of the generator further comprises:

estimating a first derivative of the shaft torque of the generator; and comparing the first derivative to a threshold to identify the slip event occurring in the slip coupling.

Clause 6. The method of any of the preceding clauses, wherein applying the at least one algorithm to the time series of the plurality of operating signals of the generator to generate the processed time series of the of the plurality of operating signals of the generator further comprises identifying a certain frequency pattern of rotor current to identify the slip event occurring in the slip coupling.

Clause 7. The method of any of the preceding clauses, wherein applying the at least one algorithm to the time series of the plurality of operating signals of the generator to generate the processed time series of the of the plurality of operating signals of the generator further comprises:

utilizing at least one of one or more artificial neural networks and one more classification techniques and at least one of the generator speed, the shaft torque of the generator, and an instantaneous frequency of rotor current to identify the slip event occurring in the slip coupling.

Clause 8. The method of any of the preceding clauses, wherein utilizing at least one of the one or more artificial neural networks and the one more classification techniques and at least one of the generator speed, the shaft torque of the generator, and the instantaneous frequency of the generator current to identify the slip event occurring in the slip coupling further comprises:

receiving the time series of the plurality of operating signals of the generator; and analyzing the time series of the plurality of operating signals of the generator using the one or more artificial neural networks to extract one or more low-dimensional features corresponding to multi-variate time-series windows.

Clause 9. The method of any of the preceding clauses, wherein the one or more artificial neural networks comprises at least one of a temporal convolutional network or a long short-term memory (LSTM) neural network.

Clause 10. The method of any of the preceding clauses, wherein utilizing at least one of the one or more artificial neural networks and the one more classification techniques and at least one of the generator speed, the shaft torque of the generator, and the instantaneous frequency of rotor current to identify the slip event occurring in the slip coupling further comprises:

receiving the time series of the plurality of operating signals of the generator; and estimating a pattern of one or more divergences from a normal pattern in the time series of the plurality of operating signals of the generator.

Clause 11. The method of any of the preceding clauses, wherein applying the at least one algorithm to the time series of the plurality of operating signals of the generator to generate the processed time series of the of the plurality of operating signals of the generator further comprises:

analyzing at least one of the time series of the plurality of operating signals of the generator or a time series of the shaft torque of the generator along with one or more optional wind parameters at a start of a slip event using one or more artificial neural networks to extract one or more low-dimensional features corresponding to multi-variate time-series windows or comparing the shaft torque or a coupling torque at the start of the slip event to a threshold; and trending one or more divergences of the one or more low-dimensional features from a normal condition feature set.

Clause 12. The method of any of the preceding clauses, wherein identifying the patterns in the processed time series of the plurality of operating signals of the generator to identify either of the slip event occurring in the slip coupling or the surface health of the slip coupling further comprises:

utilizing the one or more low-dimensional features and one or more historical loading conditions to identify the surface health of the slip coupling using one or more Bayesian models.

Clause 13. The method of any of the preceding clauses, wherein identifying the patterns in the processed time series of the plurality of operating signals of the generator to identify either of the slip event occurring in the slip coupling or the surface health of the slip coupling further comprises:

analyzing the time series of a plurality of operating signals of the generator at a start of a slip event using one or more artificial neural networks to extract one or more low-dimensional features corresponding to multi-variate time-series window.

Clause 14. The method of any of the preceding clauses, further comprising:

estimating an energy dissipation and a temperature rise based on the shaft torque, the rotor speed, and the generator speed during one or more slip events; and trending the energy dissipation and the temperature rise to determine an accumulated degradation of the surface health of the slip coupling.

Clause 15. The method of any of the preceding clauses, wherein the drivetrain is part of a wind turbine.

Clause 16. A method for operating a generator of a wind turbine, the wind turbine having a hub rotatably coupled to the generator via a rotor shaft that rotatably drives a gearbox that subsequently drives a generator shaft having a slip coupling, the method comprising:

generating, via a controller, a time series of a plurality of operating signals of the generator;

applying at least one algorithm to the time series of the plurality of operating signals of the generator to generate a processed time series of the of the plurality of operating signals of the generator;

identifying, via the controller, patterns in the processed time series of the plurality of operating signals of the generator to estimate torque information relating to the generator shaft;

predicting a start of a slip event occurring in the slip coupling using the torque information relating to the generator shaft; and, controlling a power converter of the wind turbine to mitigate the slip event.

Clause 17. A system for operating a generator of a wind turbine, the wind turbine having a hub rotatably coupled to the generator via a rotor shaft that rotatably drives a gearbox that subsequently drives a generator shaft having a slip coupling, the system comprising:
  a controller comprising at least one processor, the at least one processor configured to implement a plurality of operations, the plurality of operations comprising:
    generating a time series of a plurality of operating signals of the generator;
    applying at least one algorithm to the time series of the plurality of operating signals of the generator to generate a processed time series of the of the plurality of operating signals of the generator;
    identifying patterns in the processed time series of the plurality of operating signals of the generator to identify a start of at least one slip event occurring in the slip coupling or surface health degradation of the slip coupling; and,
    implementing a control action when the at least one slip event occurring in the slip coupling is identified or the surface health of the slip coupling is indicative of degradation in the slip coupling.

Clause 18. The system of clause 17, wherein the plurality of operating signals comprises at least one of generator speed, rotor speed, generator current, or generator voltage.

Clause 19. The system of clauses 17-18, wherein applying the at least one algorithm to the time series of the plurality of operating signals of the generator to generate the processed time series of the of the plurality of operating signals of the generator further comprises:
  determining a second derivative of the generator speed; and
  comparing the second derivative to a threshold to identify the slip event occurring in the slip coupling.

Clause 20. The system of clauses 17-19, wherein applying the at least one algorithm to the time series of the plurality of operating signals of the generator to generate the processed time series of the of the plurality of operating signals of the generator further comprises:
  estimating an electromagnetic torque of the generator as a function of the generator current and the generator voltage;
  estimating a shaft torque of the generator using the electromagnetic torque of the generator and the generator speed; and
  estimating a coupling torque of the generator using the shaft torque.

This written description uses examples to disclose the disclosure, including the best mode, and also to enable any person skilled in the art to practice the disclosure, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the disclosure is by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a drivetrain having a generator and a shaft, the shaft having a slip coupling mounted thereon, the method comprising:
  receiving, via a controller, a time series of a plurality of operating signals of the generator, the plurality of operating signals comprising generator speed, generator current, and generator voltage;
  applying at least one algorithm to the time series of the plurality of operating signals of the generator to generate a processed time series of the plurality of operating signals of the generator, wherein applying the at least one algorithm to the time series of the plurality of operating signals of the generator further comprises estimating an electromagnetic torque of the generator as a function of the generator speed, the generator current, and the generator voltage, estimating a shaft torque of the generator using the electromagnetic torque of the generator and the generator speed, and estimating a coupling torque of the generator using the shaft torque;
  identifying, via the controller, patterns in the processed time series of the plurality of operating signals of the generator to identify either of a slip event occurring in the slip coupling or a surface health of the slip coupling; and
  implementing, via the controller, a control action when the slip event occurring in the slip coupling is identified or the surface health of the slip coupling is indicative of degradation in the slip coupling,
  wherein applying the at least one algorithm to the time series of the plurality of operating signals of the generator to generate the processed time series of the plurality of operating signals of the generator further comprises at least one of estimating a first derivative of the shaft torque of the generator or determining a second derivative of the generator speed.

2. The method of claim 1, wherein applying the at least one algorithm to the time series of the plurality of operating signals of the generator to generate the processed time series of the plurality of operating signals of the generator further comprises:
  comparing the second derivative of the generator speed to a threshold to identify the slip event occurring in the slip coupling.

3. The method of claim 1, wherein applying the at least one algorithm to the time series of the plurality of operating signals of the generator to generate the processed time series of the plurality of operating signals of the generator further comprises:
  comparing the first derivative of the shaft torque to a threshold to identify the slip event occurring in the slip coupling.

4. The method of claim 1, wherein applying the at least one algorithm to the time series of the plurality of operating signals of the generator to generate the processed time series of the of the plurality of operating signals of the generator further comprises identifying a certain frequency pattern of rotor current to identify the slip event occurring in the slip coupling.

5. The method of claim 1, wherein applying the at least one algorithm to the time series of the plurality of operating signals of the generator to generate the processed time series of the plurality of operating signals of the generator further comprises:
  utilizing at least one of one or more artificial neural networks and one more classification techniques and at least one of the generator speed, the shaft torque of the generator, and an instantaneous frequency of rotor current to identify the slip event occurring in the slip coupling.

6. The method of claim 5, wherein utilizing at least one of the one or more artificial neural networks and the one more classification techniques and at least one of the generator speed, the shaft torque of the generator, and the instantaneous frequency of the generator current to identify the slip event occurring in the slip coupling further comprises:
receiving the time series of the plurality of operating signals of the generator; and
analyzing the time series of the plurality of operating signals of the generator using the one or more artificial neural networks to extract one or more low-dimensional features corresponding to multi-variate time-series windows.

7. The method of claim 6, wherein the one or more artificial neural networks comprises at least one of a temporal convolutional network or a long short-term memory (LSTM) neural network.

8. The method of claim 5, wherein utilizing at least one of the one or more artificial neural networks and the one more classification techniques and at least one of the generator speed, the shaft torque of the generator, and the instantaneous frequency of rotor current to identify the slip event occurring in the slip coupling further comprises:
receiving the time series of the plurality of operating signals of the generator; and
estimating a pattern of one or more divergences from a normal pattern in the time series of the plurality of operating signals of the generator.

9. The method of claim 8, wherein identifying the patterns in the processed time series of the plurality of operating signals of the generator to identify either of the slip event occurring in the slip coupling or the surface health of the slip coupling further comprises:
analyzing the time series of a plurality of operating signals of the generator at a start of a slip event using one or more artificial neural networks to extract one or more low-dimensional features corresponding to multi-variate time-series window.

10. The method of claim 1, wherein applying the at least one algorithm to the time series of the plurality of operating signals of the generator to generate the processed time series of the plurality of operating signals of the generator further comprises:
analyzing at least one of the time series of the plurality of operating signals of the generator or a time series of the shaft torque of the generator along with one or more optional wind parameters at a start of a slip event using one or more artificial neural networks to extract one or more low-dimensional features corresponding to multi-variate time-series windows or comparing the shaft torque or the coupling torque at the start of the slip event to a threshold; and
trending one or more divergences of the one or more low-dimensional features from a normal condition feature set.

11. The method of claim 10, wherein identifying the patterns in the processed time series of the plurality of operating signals of the generator to identify either of the slip event occurring in the slip coupling or the surface health of the slip coupling further comprises:
utilizing the one or more low-dimensional features and one or more historical loading conditions to identify the surface health of the slip coupling using one or more Bayesian models.

12. The method of claim 1, further comprising:
estimating an energy dissipation and a temperature rise based on the shaft torque, the rotor speed, and the generator speed during one or more slip events; and
trending the energy dissipation and the temperature rise to determine an accumulated degradation of the surface health of the slip coupling.

13. The method of claim 1, wherein the drivetrain is part of a wind turbine.

14. A method for operating a generator of a wind turbine, the wind turbine having a hub rotatably coupled to the generator via a rotor shaft that rotatably drives a gearbox that subsequently drives a generator shaft having a slip coupling, the method comprising:
generating, via a controller, a time series of a plurality of operating signals of the generator;
applying at least one algorithm to the time series of the plurality of operating signals of the generator to generate a processed time series of the plurality of operating signals of the generator;
identifying, via the controller, patterns in the processed time series of the plurality of operating signals of the generator to estimate torque information relating to the generator shaft;
predicting a start of a slip event occurring in the slip coupling using the torque information relating to the generator shaft; and
controlling a power converter of the wind turbine to mitigate the slip event;
wherein the plurality of operating signals comprise at least one of a generator speed, a rotor speed, a generator current, or a generator voltage: estimating an electromagnetic torque of the generator as a function of the generator current and the generator voltage; estimating a shaft torque of the generator using the electromagnetic torque of the generator and the generator speed; and estimating a coupling torque of the generator using the shaft torque, and
wherein applying the at least one algorithm to the time series of the plurality of operating signals of the generator to generate the processed time series of the plurality of operating signals of the generator further comprises estimating a first derivative of a shaft torque of the generator.

15. A system for operating a generator of a wind turbine, the wind turbine having a hub rotatably coupled to the generator via a rotor shaft that rotatably drives a gearbox that subsequently drives a generator shaft having a slip coupling, the system comprising:
a controller comprising at least one processor, the at least one processor configured to implement a plurality of operations, the plurality of operations comprising:
generating a time series of a plurality of operating signals of the generator, the plurality of operating signals comprising at least one of generator speed, rotor speed, generator current, or generator voltage;
applying at least one algorithm to the time series of the plurality of operating signals of the generator to generate a processed time series of the plurality of operating signals of the generator, wherein applying the at least one algorithm to the time series of the plurality of operating signals of the generator further comprises estimating an electromagnetic torque of the generator as a function of the generator current and the generator voltage, estimating the shaft torque of the generator using the electromagnetic torque of the generator and the generator speed, and estimating a coupling torque of the generator using the shaft torque;

identifying patterns in the processed time series of the plurality of operating signals of the generator to identify a start of at least one slip event occurring in the slip coupling or surface health degradation of the slip coupling; and implementing a control action when the at least one slip event occurring in the slip coupling is identified or the surface health of the slip coupling is indicative of degradation in the slip coupling, wherein applying the at least one algorithm to the time series of the plurality of operating signals of the generator to generate the processed time series of the plurality of operating signals of the generator further comprises at least one of estimating a first derivative of the shaft torque of the generator or determining a second derivative of the generator speed.

16. The system of claim 15, wherein applying the at least one algorithm to the time series of the plurality of operating signals of the generator to generate the processed time series of the plurality of operating signals of the generator further comprises:
   comparing the second derivative to a threshold to identify the slip event occurring in the slip coupling.

17. The system of claim 15, further comprising:
   estimating an energy dissipation and a temperature rise based on the shaft torque, the rotor speed, and the generator speed during one or more slip events; and
   trending the energy dissipation and the temperature rise to determine an accumulated degradation of the surface health of the slip coupling.

* * * * *